US012802050B2

(12) United States Patent
Vijayaraghavan

(10) Patent No.: US 12,802,050 B2
(45) Date of Patent: Nov. 17, 2026

(54) SYSTEMS AND METHODS FOR SHARED LEDGER FOR SUB-MERCHANT ONBOARDING

(71) Applicant: Worldpay, LLC, Symmes Township, OH (US)

(72) Inventor: Ramesh Vijayaraghavan, Mason, OH (US)

(73) Assignee: Worldpay, LLC, Symmes Township, OH (US)

( * ) Notice: Subject to any disclaimer, the term of this patent is extended or adjusted under 35 U.S.C. 154(b) by 0 days.

(21) Appl. No.: 18/802,262

(22) Filed: Aug. 13, 2024

(65) Prior Publication Data

US 2024/0403841 A1 Dec. 5, 2024

Related U.S. Application Data

(63) Continuation of application No. 16/578,614, filed on Sep. 23, 2019, now abandoned.

(51) Int. Cl.

| | |
|---|---|
| ***G06Q 20/02*** | (2012.01) |
| ***G06Q 20/08*** | (2012.01) |
| ***G06Q 50/18*** | (2012.01) |
| ***H04L 9/06*** | (2006.01) |

(52) U.S. Cl.

CPC ....... *G06Q 20/027* (2013.01); *G06Q 20/0855* (2013.01); *G06Q 50/188* (2013.01); *H04L 9/0637* (2013.01)

(58) Field of Classification Search

CPC ............. G06Q 20/027; G06Q 20/0855; G06Q 50/188; H04L 9/0637; H04L 9/50

See application file for complete search history.

(56) References Cited

U.S. PATENT DOCUMENTS

| | | | | |
|---|---|---|---|---|
| 7,103,570 B1 * | 9/2006 | Morea | G06Q 30/0601 | 705/26.1 |
| 10,963,846 B1 * | 3/2021 | Cunliffe | G06Q 50/10 | |
| 2014/0081844 A1 * | 3/2014 | Hosp | G06Q 20/4015 | 705/39 |
| 2014/0279533 A1 * | 9/2014 | Hamilton | G06Q 40/00 | 705/35 |
| 2017/0169404 A1 * | 6/2017 | Mudulodu | G06Q 20/2295 | |
| 2017/0243193 A1 * | 8/2017 | Manian | G06Q 20/3829 | |
| 2019/0272537 A1 * | 9/2019 | Miller | G06Q 20/389 | |
| 2020/0074461 A1 * | 3/2020 | Derosa-Grund | H04N 21/2543 | |

* cited by examiner

*Primary Examiner* — Yingying Zhou

(74) *Attorney, Agent, or Firm* — Bookoff McAndrews, PLLC

(57) ABSTRACT

A computer-implemented method for generating and maintaining shared ledgers for sub-merchant onboarding includes receiving a request from a payment facilitator to onboard a sub-merchant, receiving information about the sub-merchant from the payment facilitator or the sub-merchant, providing the information about the sub-merchant to a third party, receiving underwriting information corresponding to the information about the sub-merchant from the third party, generating an onboarding decision based on the information about the sub-merchant and the underwriting information, storing the information about the sub-merchant, the underwriting information, and the onboarding decision to a shared ledger, and generating and transmitting an electronic offer of a product or a service to the sub-merchant based on the stored contents of the shared ledger.

14 Claims, 4 Drawing Sheets

SYSTEMS AND METHODS FOR SHARED LEDGER FOR SUB-MERCHANT ONBOARDING

CROSS-REFERENCE TO RELATED APPLICATION(S)

This patent application is a continuation of and claims the benefit of priority to U.S. Nonprovisional patent application Ser. No. 16/578,614, filed on Sep. 23, 2019, the entirety of which is incorporated herein by reference.

TECHNICAL FIELD

Various embodiments of the present disclosure relate generally to the field of payment transactions and, more particularly, to using blockchain technology to facilitate added services for partner merchants and payment facilitators.

BACKGROUND

Acquirer processors provide payment processing services for merchants or other entities that accept payments from holders of payment cards, such as credit or debit cards, etc. However, in some circumstances a merchant or service provider may lack the necessary infrastructure or other requirements to interact directly with an acquirer processor. In such circumstances, a payment facilitator, sometimes referred to as a "PayFac," may serve as an intermediary for the merchant to facilitate interactions with the acquirer processor. In such an arrangement, the merchant becomes a sub-merchant of the payment facilitator. This often involves the acquirer processor forming a relationship with the sub-merchant, which may include execution of a contract, and analysis of underwriting information regarding the sub-merchant. This process is sometimes referred to as "onboarding" the sub-merchant. Commonly, information about the sub-merchant, including underwriting information, contract status, and onboarding processing information, as well as transaction information after the sub-merchant has been onboarded, is not stored in a secure, accessible format. This prevents the payment facilitator and acquirer processor from presenting appropriate additional partnerships or offers to sub-merchants based on the previously determined information about the sub-merchant. This may result in lost opportunities and lost revenue for the acquirer process and payment facilitator.

The present disclosure is directed to overcoming one or more of these above-referenced challenges.

SUMMARY OF THE DISCLOSURE

According to certain aspects of the present disclosure, systems and methods are disclosed for generating and maintaining shared ledgers for sub-merchant onboarding.

In one embodiment, a computer-implemented method is disclosed for generating and maintaining shared ledgers for sub-merchant onboarding, the method comprising: receiving a request from a payment facilitator to onboard a sub-merchant, receiving information about the sub-merchant from the payment facilitator or the sub-merchant, providing the information about the sub-merchant to a third party, receiving underwriting information corresponding to the information about the sub-merchant from the third party, generating an onboarding decision based on the information about the sub-merchant and the underwriting information, storing the information about the sub-merchant, the underwriting information, and the onboarding decision to a shared ledger, and generating and transmitting an electronic offer of a product or a service to the sub-merchant based on the stored contents of the shared ledger.

In accordance with another embodiment, a system is disclosed for generating and maintaining shared ledgers for sub-merchant onboarding, the system comprising: a data storage device storing instructions for shared ledger for sub-merchant onboarding in an electronic storage medium; and a processor configured to execute the instructions to perform a method including: receiving a request from a payment facilitator to onboard a sub-merchant, receiving information about the sub-merchant from the payment facilitator or the sub-merchant, providing the information about the sub-merchant to a third party, receiving underwriting information corresponding to the information about the sub-merchant from the third party, generating an onboarding decision based on the information about the sub-merchant and the underwriting information, storing the information about the sub-merchant, the underwriting information, and the onboarding decision to a shared ledger, and generating and transmitting an electronic offer of a product or a service to the sub-merchant based on the stored contents of the shared ledger.

In accordance with another embodiment, a non-transitory machine-readable medium storing instructions that, when executed by the a computing system, causes the computing system to perform a method for generating and maintaining shared ledgers for sub-merchant onboarding, the method including: receiving a request from a payment facilitator to onboard a sub-merchant, receiving information about the sub-merchant from the payment facilitator or the sub-merchant, providing the information about the sub-merchant to a third party, receiving underwriting information from the third party, generating an onboarding decision based on the information about the sub-merchant and the underwriting information, storing the information about the sub-merchant, the underwriting information, and the onboarding decision to a shared ledger, and generating and transmitting an electronic offer of a product or a service to the sub-merchant based on the stored contents of the shared ledger.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Figure 1:
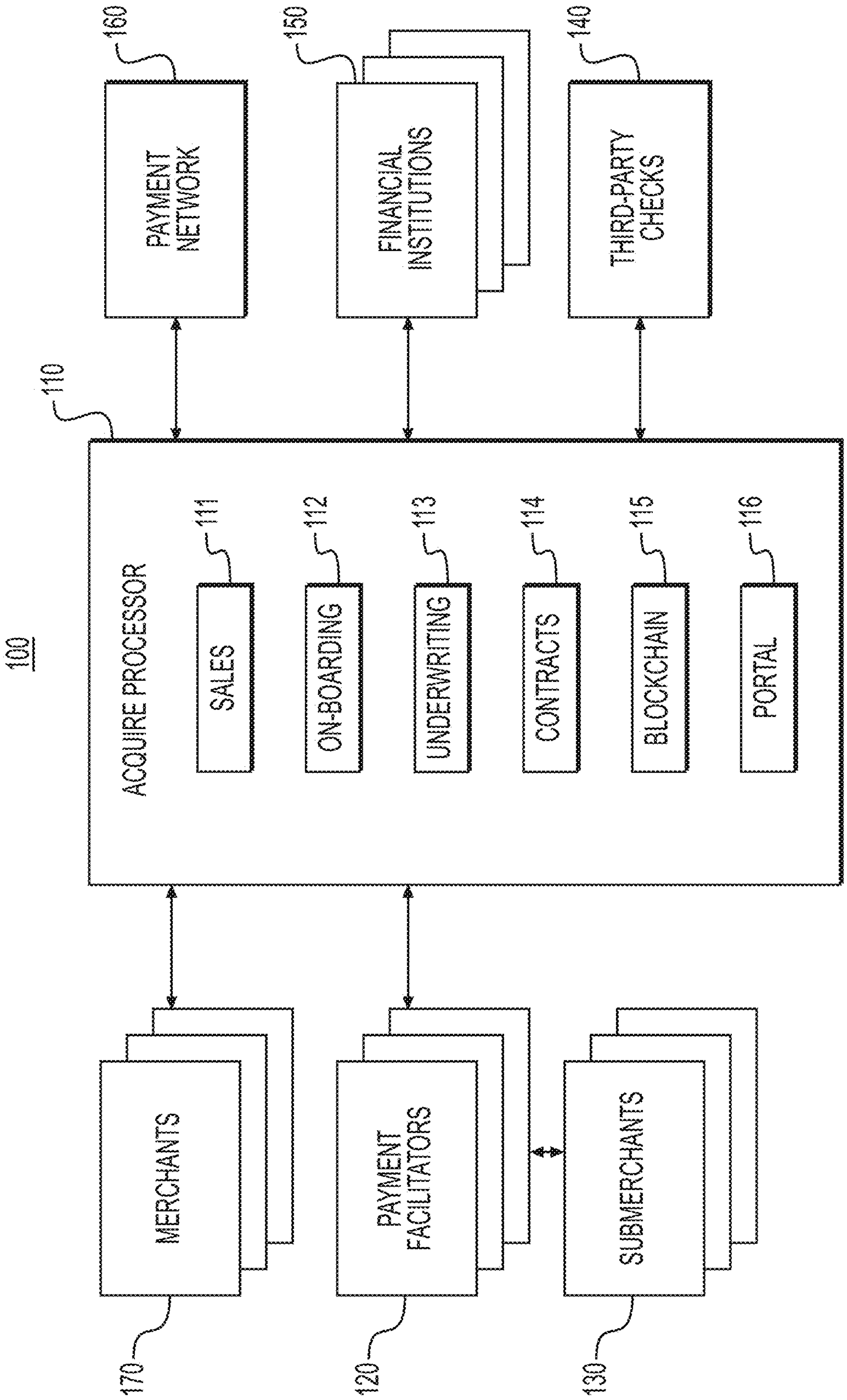
FIG. 1 depicts an exemplary system infrastructure for generating and maintaining shared ledgers for sub-merchant onboarding, according to one or more embodiments.

As discussed above, in some circumstances a merchant may enlist the services of another merchant, or a "payment facilitator," to act as an intermediary in submitting transactions for processing by an acquirer processor. The merchant may, then, be referred to as "sub-merchant" of the payment facilitator. Such an arrangement may involve the sub-merchant and the payment facilitator first being enrolled, or "onboarded," by the acquirer processor. FIG. 1 depicts an exemplary system infrastructure for onboarding sub-merchants and payment facilitators in a system for processing payments, according to one or more embodiments. As shown in FIG. 1, in an electronic payment processing system 100, a consumer, during the checkout process with a merchant 170, may pay for goods or services from merchant 170 through a point-of-sale ("POS") terminal, such as, for example, at a PIN pad associated with the POS terminal. The consumer may use a payment card as payment and the transaction may then be processed. Because merchant 170 generally can use a different bank or financial institution 150 than the consumer, an acquirer processor 110 handles the financial transactions that transfer payment between the financial institution 150 of the consumer and that of merchant 170. If required, the consumer may submit payment information at the PIN pad associated with the POS terminal of merchant 170, such as by swiping his or her payment card, inserting his or her chip-based payment card through wireless near field communication (NFC), etc., or by any other suitable means. Merchant 170 may then send a payment request by way of a computer network to acquirer processor 110. Such a payment request may be sent by the PIN pad or the POS terminal of merchant 170. Acquirer processor 110 may request, by way of payment network 160, an electronic transfer of funds from the received funds to the financial institution 150 associated with merchant 170.

In some circumstances, a merchant or service provider may lack the necessary infrastructure or other requirements to interact directly with acquirer processor 110. In such circumstances, the merchant or service provider may enroll as a sub-merchant 130 of another merchant acting as a payment facilitator 120 to enable submission of transactions from sub-merchant 130 to acquirer processor 110. Payment facilitator 120 may be a Software as a Service provider (SaaS) that provides payment services in addition to the other software services they offer the merchants. For example, the consumer may present a payment vehicle to a sub-merchant 130 for payment of goods or services at a point-of-sale terminal associated with the sub-merchant 130. In the illustrated embodiment, the payment vehicle may be issued by a financial institution 150. In some embodiments, sub-merchant 130 may be, for example, an online merchant that is configured to accept "card-not-present" transactions. Sub-merchant 130 may process payment vehicle transactions through a payment facilitator 120, sometimes referred to as a payment service provider (PSP). Payment facilitator 120 can facilitate payment vehicle processing for any number of sub-merchants 130. In some cases, the payment facilitator 120 may facilitate payment vehicle processing for hundreds or thousands of sub-merchants 130.

Payment facilitator 120 may use a payment processing platform of acquirer processor 110 to process the payment vehicle transactions of the sub-merchant 130. In some embodiments, the payment facilitator 120 may be considered the merchant-of-record, as is known in the art. The payment processing platform 120 may route the transactions through a payment network 160 and to an issuer to seek authorization for payment transactions originating at the sub-merchant 130. A merchant account may be created for the payment facilitator 120 in the payment processing platform of the acquirer processor. The payment facilitator 120 may use interfaces of the sales module 111 and onboarding module 112 functions of acquirer processor 110 to create additional sub-merchant accounts for the sub-merchants 130 to which it provides payment facilitation services.

To facilitate interactions and relationships with payment facilitators 120 and sub-merchants 130, acquirer processor 110 may include a sales module 111, which may, for example, obtain information about merchants that may desire to become a payment facilitator or sub-merchant affiliated with acquirer processor 110, an onboarding module 112, which may complete a process of affiliating a payment facilitator or sub-merchant affiliated with acquirer processor 110, an underwriting module 113, which may evaluate the risk and exposures of accepting transactions submitted by a payment facilitator or sub-merchant, a contracts module 114, which may administrate a process of entering into a contract between a payment facilitator or sub-merchant and acquirer processor 110, and a shared ledger, such as blockchain 115, which may be a secure public or semi-public ledger for storing information about a payment facilitator or sub-merchant affiliated with acquirer processor 110.

In a blockchain shared ledger, such as blockchain 115, information about a sequence of transactions may be stored in a public, semi-public, or private database, or "chain," of transactions. Each transaction may be represented in a "block" of information that includes information about a transaction. For financial transactions, such as for bitcoin cryptocurrency, this information may include the parties to the transaction and the transaction amount. However, other interactions may also be represented as transactions in a blockchain shared ledger. For example, in one or more embodiments of the present disclosure, information about sub-merchant 130, payment facilitator 120, onboarding decisions and third party checks, etc., may be represented as a "transaction" in the blockchain shared ledger.

One feature of a blockchain shared ledger is that the transactions may be verified and then stored in a block that is given a timestamp and a unique identifier or "hash." The combination of the verification and the unique hash for a block ensures that falsified transactions cannot be entered into the shared ledger, and the recorded transactions are immutable. That is, a transaction, once recorded, cannot be deleted or altered without detection. The sequence of transactions, likewise, cannot be altered without detection.

A blockchain shared ledger may be distributed in a peer-to-peer network, such that identical copies of the shared ledger are stored on the computing resources of multiple peers in the network. Thus, any attempt to alter a block on one peer may be easily detected by comparison with unaltered copies of the shared ledger on other peers. In one or more embodiments, computing resources and electronic storage present in acquirer processor 110, sub-merchants 130, and payment facilitators 120, etc., may operate as peers in the peer-to-peer network supporting a blockchain shared ledger, with each peer possibly storing a separate copy of the shared ledger.

Verification of a transaction may be by a "proof of work" scheme or a "proof of stake" scheme. In a "proof of work" scheme, verification requires performing an expensive computer calculation, such that the cost of verification is greater than a malicious party would want expend to create a falsified transaction, thus ensuring that verification can be trusted. In a "proof of stake" scheme, a verifier submits financial (or other) resources that would be forfeited in the event of a falsified transaction. The financial stake is greater than what a malicious party would want to risk in order to create a falsified transaction, thus ensuring that verification can be trusted. Verification may be provided by peers distributed across the network, thus eliminating a single point of failure or attack.

Blockchains, in general, may be public, in which any entity with the necessary credentials may join the blockchain and view and send transaction, or they may be private, in which all participants are known to each other and access to transactions is tightly controlled. Blockchain 115 may use either of these approaches, but may preferably use a hybrid blockchain approach. In a hybrid blockchain, participation in the blockchain is controlled, participants may remain anonymous to other participants, and access to transactions may be controlled by permissions. Thus, a blockchain may combine the best capabilities of public and private blockchains and may make it easier for organizations to adopt blockchains in applications, such as payment processing, which may be very sensitive to exposure of data in a public ledger. In addition, the hybrid blockchains may provide advantages in processing speed and data security.

In addition to information stored in blockchain 115, information about payment facilitators 120, sub-merchants 130, and a hierarchical relationship between them, may be stored in a partner database outside of blockchain 115. The partner database may be a relational database, such as an SQL database, or may be a non-relational database, such as a NoSQL database. Use of such a database external to blockchain 115 may allow editing or updating the partner hierarchy, such as when sub-merchants 130 are added or removed. Blockchain 115 may not be a good platform to store this information since data once added to blockchain 115 cannot be removed or altered.

A payment vehicle authorization request may be sent by the sub-merchant 130 to the acquirer processor 110. As is to be appreciated, the authorization request can be routed through various entities with a payment ecosystem, including the payment facilitator 120. Acquirer processor 110 sends a bank authorization request for a requested amount of funds to the financial institution 150 that issued the payment vehicle to the consumer. The financial institution 150 sends a bank authorization response, for example an OK response, to the acquirer processor 110 for the amount of the transaction. The sub-merchant 130 can be informed that the payment vehicle transaction is authorized.

Once the transaction has been completed, acquirer processor 110 then settles the funds according one or more settlement rules for that sub-merchant 130 and payment facilitator 120. The settlement of funds can also be based on any fee schedule associated with the financial institution 150 that issued the payment vehicle to the consumer. In some embodiments, various fees can also be provided to third parties associated with the transaction, such as a fulfillment center, or other entities. Acquirer processor 110 may deduct fees from the settle funds from the transaction to be distributed to accounts held at one or more financial institutions 150 by payment facilitator 120 or other entities.

As discussed above with respect to FIG. 1, a sub-merchant 130 may rely on a payment facilitator 120 to submit transactions to acquirer processor 110. Likewise, acquirer processor 110 may derive the benefits of additional merchants submitting transaction for processing. However, in order to allow transactions to be submitted from a sub-merchant 130 to acquirer processor 110, acquirer processor 110 may first enroll, or "onboard," the sub-merchant 130. The onboarding process, and information gathered or developed during that process, may provide acquirer processor 110 an opportunity to present payment facilitators 120 and sub-merchants 130 with offers for additional products and services.

In order to provide access to information about sub-merchants, payment facilitators, and associated transactions, acquirer 110 may provide a portal 116 as an interface to explore the transactions stored in blockchain 115. The available transactions may include any information stored in blockchain 115, including, for example, contracts, onboarding information and decisions, underwriting information, third-party checks, transaction requests, and transaction processing results, etc. The information available to the merchant, payment facilitator, sub-merchant, or agent of acquirer processor 110 accessing portal 116 may be limited according to permissions granted to the entity accessing portal 116. In some embodiments, blockchain 115 may be a hybrid blockchain, possibly allowing fine grained permissions to be granted to individual entities. For example, merchants, sub-merchants, and payment facilitators may only have access to their transaction data in the blockchain. Payment facilitators may not be able to see details and data of other payment facilitators, but payment facilitators may be granted permission to see information about their sponsored sub-merchants. Portal 116 may access the partner database that may be provided outside of blockchain 115 to access the hierarchy and partner profile data.

Figure 2:
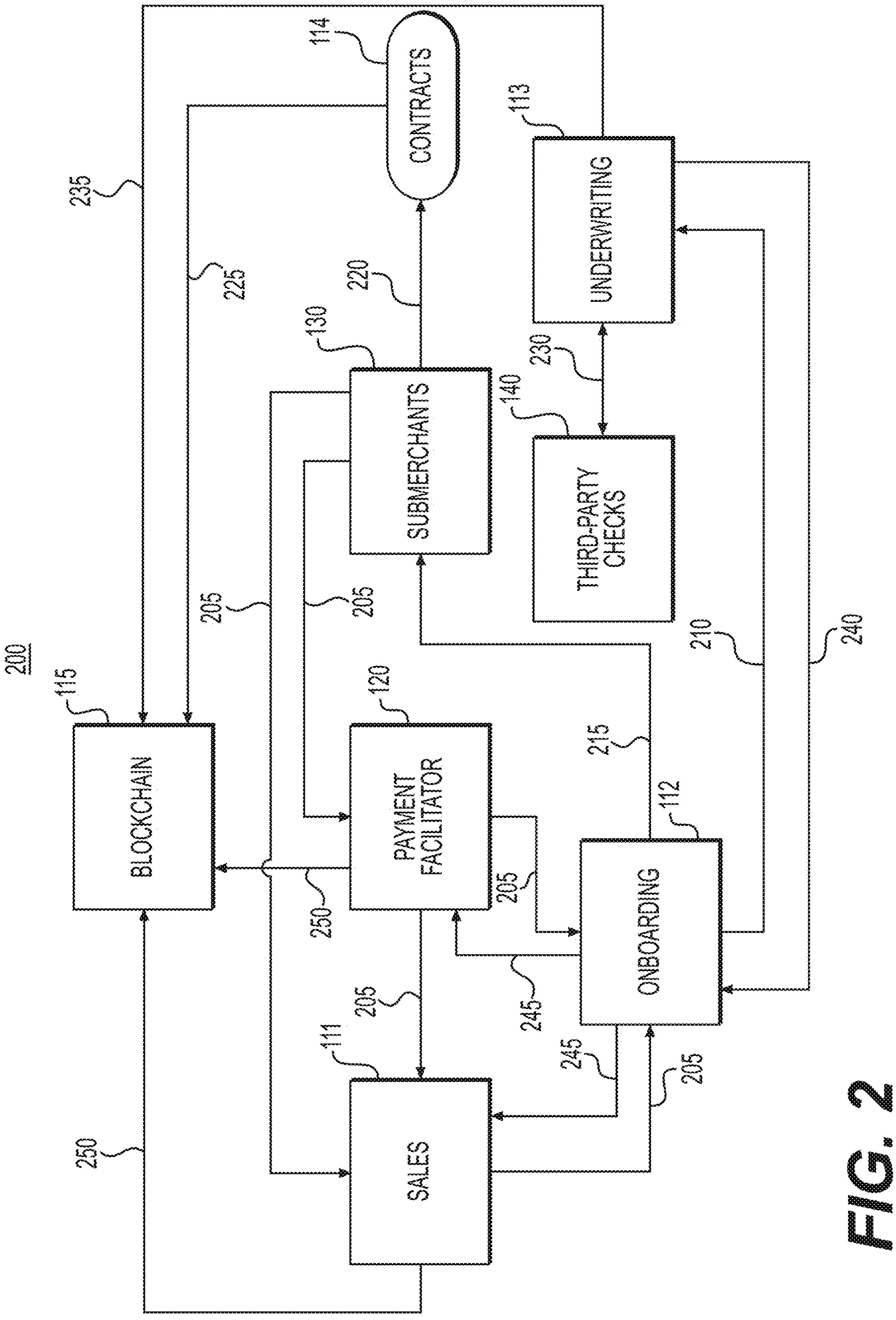
FIG. 2 depicts a process flow diagram of a method of generating and maintaining shared ledgers for sub-merchant onboarding, according to one or more embodiments.

FIG. 2 depicts a process flow diagram of a method of generating and maintaining shared ledgers for sub-merchant onboarding, according to one or more embodiments. As shown in FIG. 2, in operation 205, the boarding process may be started by merchant information being gathered by sales module 111 and/or payment facilitators 120. Information may be gathered by sales module 111 and payment facilitators 120 directly from sub-merchants 130, or may be gathered by payment facilitators 120 and then provided to sales module 111. After the information is gathered, it may be provided to onboarding module 112 to begin the process of onboarding sub-merchant 130. In operation 210, information relating to sub-merchant 130 and payment facilitator 120 may be provided to underwriting module 113. At operation 215, sub-merchant 130 may be sent a contract setting out the terms under which acquirer processor 110 will process such transactions. The contract may be provided in any suitable form, including for example, a paper form or an electronic form. An electronic form may be sent as a web link through which sub-merchant 130 or payment facilitator 120 may accept and sign the contract. In operation 220, sub-merchant 130 or payment facilitator 120 may return the signed contract to the contracts module 114 of acquirer processor 110. Return of the signed contract may be by any suitable means, including, for example, mail, document courier, email, facsimile, electronic user interface, etc. Upon receipt of the signed contract, contracts module 114 may, in operation 225, load the signed contract into blockchain 115. The contract between acquirer processor 110 and sub-merchant 130 may be conditioned on an underwriting determination by underwriting module 113. Underwriting module 113 may evaluate the risk and exposures of accepting transactions submitted by sub-merchant 130 and payment facilitator 120. Underwriting module 113 may determine whether to partner with sub-merchant 130 and payment facilitator 120, and what fees should be charged for processing transactions. This may include measuring risk exposure of accepting transactions submitted by sub-merchant 130 or payment facilitator 120 and determining the fees that to be charged to take on that risk. The onboarding process may underwrite the payment facilitator first in some circumstances where there is, for example, an expectation of increased risk associated with the payment facilitator, such as operation in a highly risky industry such as gaming or casino operations. In operation 230, the underwriting module 113 may contact one or more third party sources for background checks on sub-merchant 130 or payment facilitator 120, such as, for example, a tax ID number (TIN) validation, an Office of Foreign Asset Control (OFAC) check, a credit check through one or more credit reporting agencies, a demand deposit account (DDA) check, or a "know your customer" (KYC) check, etc. In operation 235, the underwriting module 113 may publish the responses from the third party checks into blockchain 115 as part of the underwriting decision process. If the underwriting decision is negative, such that transactions submitted by sub-merchant 130 should not be accepted and sub-merchant 130 cannot be onboarded, underwriting module 113 may notify payment facilitator 120 of the underwriting decision. Underwriting module 113 may publish the underwriting decision to blockchain 115 and such that it may be available for consideration for future underwriting decisions with respect to sub-merchant 130 or payment facilitator 120. In operation 240, underwriting module 113 may provide the underwriting decision to onboarding module 112. If the underwriting decision is positive, such that transactions submitted by sub-merchant 130 should be accepted and sub-merchant 130 can be onboarded, onboarding module 112 may complete the onboarding process. Subsequently, in operation 245 onboarding module 112 may provide the onboard status to sales module 111 and payment facilitator 120. Payment facilitator 120 may, in turn, provide the onboard status to sub-merchant 130. Finally, in operation 250, payment facilitator 120 and sales module 111 make use of data stored in blockchain 115, including, or example, underwriting scores, third party check data, and underwriting decisions, etc., to make additional partnering decisions, or "soft-underwrite," sub-merchants 130 and possibly to offer new products and services.

This process of "soft-underwriting" sub-merchants 130 may leverage data stored in blockchain 115 to offer more additional services tailored to the needs and capabilities of sub-merchants 130 and payment facilitators 120. In this sense, this process may be considered "frictionless" in comparison to conventional systems, in which such product or services offers may require additional cycles of offer, acceptance, and underwriting. Also, in conventional systems, such data may not be stored because a profile of a sub-merchant or payment facilitator may change over time and, thus, products/services of interest may change. However, because blockchain 115 stores a current picture of a sub-merchant's transactions and other data, the offers for additional services can be automatically tailored to the current needs and capabilities of sub-merchants 130 and payment facilitators 120. This may be done by way of a match between payment facilitator 120 or sub-merchant 130 profile data and attributes of additional product or service that may be offered. For example, acquirer processor 110 may determine a "score" based on combination of payment facilitator 120 or sub-merchant 130 profile data and attributes of additional product or service, and determine whether to make offer based on the score.

Figure 3:
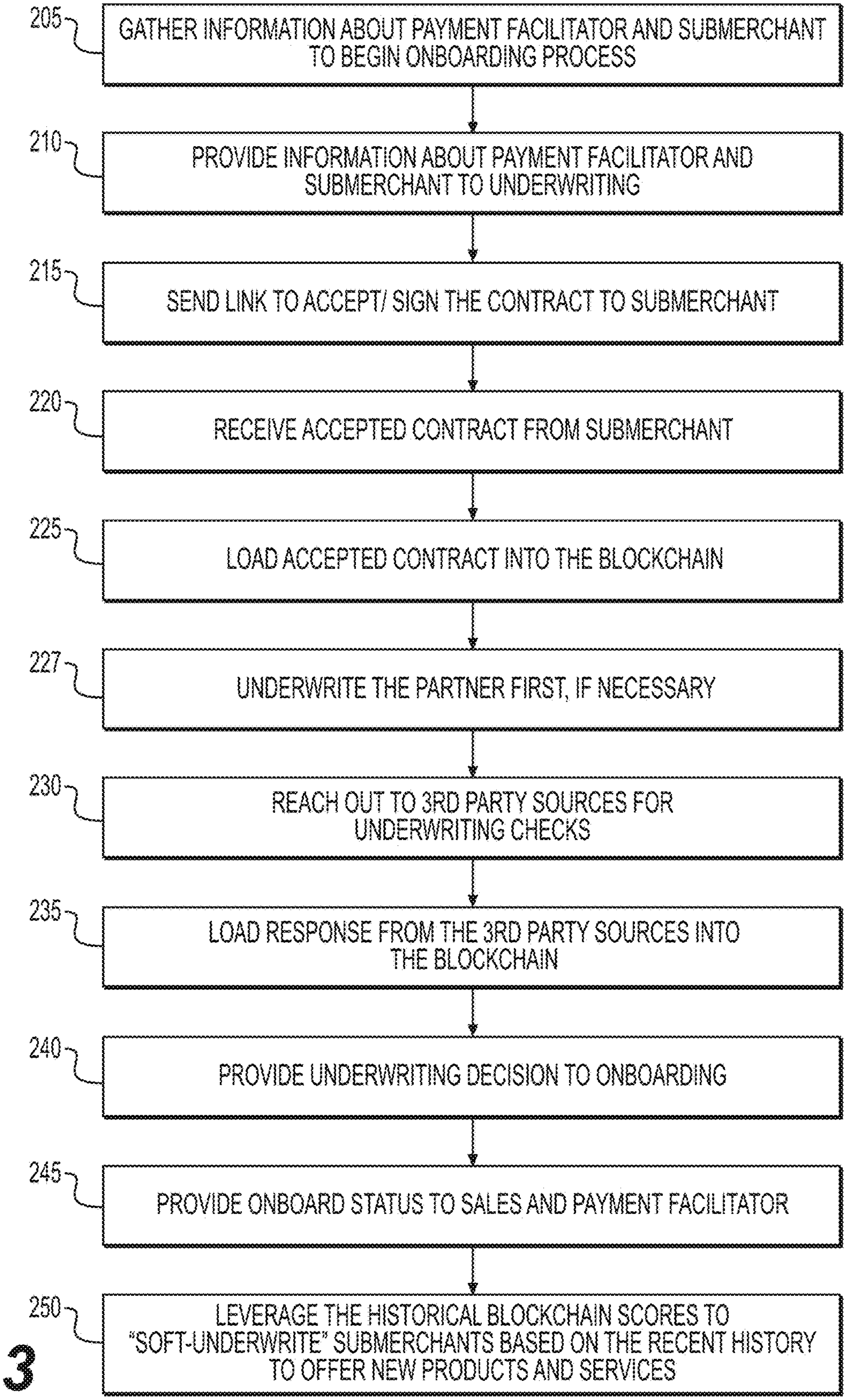
FIG. 3 depicts a flowchart of a method of generating and maintaining shared ledgers for sub-merchant onboarding, according to one or more embodiments.

FIG. 3 depicts a flowchart of a method of generating and maintaining shared ledgers for sub-merchant onboarding, according to one or more embodiments. As shown in FIG. 3, in operation 205, the boarding process may be started by merchant information being gathered by sales module 111 and/or payment facilitators 120. After the information is gathered, it may be provided to onboarding module 112 to begin the process of onboarding sub-merchant 130. In operation 210, information relating to sub-merchant 130 and payment facilitator 120 may be provided to underwriting module 113. At operation 215, sub-merchant 130 may be sent a contract setting out the terms under which acquirer processor 110 will process such transactions. In operation 220, sub-merchant 130 or payment facilitator 120 may return the signed contract to the contracts module 114 of acquirer processor 110. Upon receipt of the signed contract, contracts module 114 may, in operation 225, load the signed contract into blockchain 115. In operation 230, the underwriting module 113 may contact one or more third party sources for background checks on sub-merchant 130 or payment facilitator 120, such as, for example, a tax ID number (TIN) validation, an Office of Foreign Asset Control (OFAC) check, a credit check through one or more credit reporting agencies, a demand deposit account (DDA) check, or a "know your customer" (KYC) check, etc. In operation 235, the underwriting module 113 may publish the responses from the third party checks into blockchain 115 as part of the underwriting decision process. In operation 240, underwriting module 113 may provide the underwriting decision to onboarding module 112. Subsequently, in operation 245 onboarding module 112 may provide the onboard status to sales module 111 and payment facilitator 120. Payment facilitator 120 may, in turn, provide the onboard status to sub-merchant 130. Finally, in operation 250, payment facilitator 120 and sales module 111 make use of data stored in blockchain 115 to make additional partnering decisions, or "soft-underwrite," sub-merchants 130 and possibly to offer new products and services.

Figure 4:
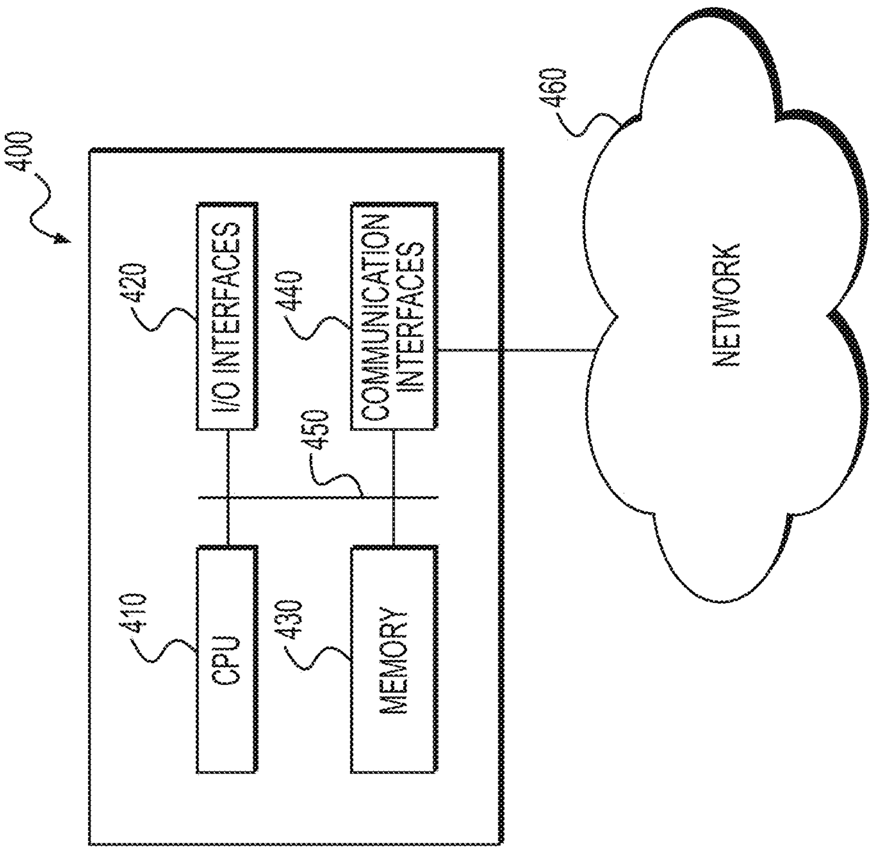
FIG. 4 is a block diagram of an example computing environment, according to one or more embodiments.

Any suitable system infrastructure may be put into place to allow user control of an interactive audiovisual environment, and engagement assessment. FIGS. 1 and 4 and the discussion above provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIGS. 1 and 4. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

For example, the systems and processes described above may be performed on or between one or more computing devices, e.g. configuration service. FIG. 4 illustrates an example computing device. A computing device 400 may be a server, a computing device that is integrated with other systems or subsystems, a mobile computing device such as a smart phone, a cloud-based computing ability, and so forth. The computing device 400 may be any suitable computing device as would be understood in the art, including without limitation, a custom chip, and embedded processing device, a tablet computing device, a POS terminal associated with the merchant 170 or submerchant 130, a back-office system of a merchant 170 or submerchant 130, a personal data assistant (PDA), a desktop, laptop, microcomputer, and minicomputer, a server, a mainframe, or any other suitable programmable device. In various embodiments disclosed herein, a single component may be replaced by multiple components and multiple components may be replaced by single component to perform a given function or functions. Except where such substitution would not be operative, such substitution is within the intended scope of the embodiments.

The computing device 400 may include a processor 410 that may be any suitable type of processing unit, for example a general-purpose central processing unit (CPU), a reduced instruction set computer (RISC), a processor that has a pipeline or multiple processing capability including having multiple cores, a complex instruction set computer (CISC), a digital signal processor (DSP), application specific integrated circuits (ASIC), a programmable logic devices (PLD), and a field programmable gate array (FPGA), among others. The computing resources may also include distributed computing devices, cloud computing resources, and virtual computing resources in general.

The computing device 400 may also include one or more memories 430, for example read-only memory (ROM), random access memory (RAM), cache memory associated with the processor 410, or other memory such as dynamic RAM (DRAM), static RAM (SRAM), programmable ROM (PROM), electrically erasable PROM (EEPROM), flash memory, a removable memory card or disc, a solid-state drive, and so forth. The computing device 400 also includes storage media such as a storage device that may be configured to have multiple modules, such as magnetic disk drives, floppy drives, tape drives, hard drives, optical drives and media, magneto-optical drives and media, compact disk drives, Compact Disc Read Only Memory (CD-ROM), compact disc recordable (CD-R), Compact Disk Rewritable (CD-RW), a suitable type of Digital Versatile Disc (DVD) or BluRay disc, and so forth. Storage media such as flash drives, solid-state hard drives, redundant array of individual discs (RAID), virtual drives, networked drives and other memory means including storage media on the processor 410, or memories 430 are also contemplated as storage devices. It may be appreciated that such memory may be internal or external with respect to operation of the disclosed embodiments. It may be appreciated that certain portions of the processes described herein may be performed using instructions stored on a computer readable medium or media that direct computer system to perform the process steps. Non-transitory computable-readable media, as used herein, comprises all computer-readable media except for transitory, propagating signals.

Networking communication interfaces 440 may be configured to transmit to, or receive data from, other computing devices 400 across a network 460. The network and communication interfaces 440 may be, for example, an Ethernet interface, a radio interface, a Universal Serial Bus (USB) interface, or any other suitable communications interface and may include receivers, transmitter, and transceivers. For purposes of clarity, a transceiver may be referred to as a receiver or a transmitter when referring to only the input or only the output functionality of the transceiver. Example communication interfaces 440 may include wire data transmission links such as Ethernet and TCP/IP. The communication interfaces 440 may include wireless protocols for interfacing with private or public networks 460. For example, the network and communication interfaces 440 and protocols may include interfaces for communicating with private wireless networks such as Wi-Fi network, one of the IEEE 802.11x family of networks, or another suitable wireless network. The network and communication interfaces 440 may include interfaces and protocols for communicating with public wireless networks 460, using for example wireless protocols used by cellular network providers, including Code Division Multiple Access (CDMA) and Global System for Mobile Communications (GSM). A computing device 400 may use network and communication interfaces 440 to communicate with hardware modules such as a database or data store, or one or more servers or other networked computing resources. Data may be encrypted or protected from unauthorized access.

In various configurations, the computing device 400 may include a system bus 450 for interconnecting the various components of the computing device 400, or the computing device 400 may be integrated into one or more chips such as programmable logic device or application specific integrated circuit (ASIC). The system bus 470 may include a memory controller, a local bus, or a peripheral bus for supporting input and output devices 420, and communication interfaces 460. Example input and output devices 420 include keyboards, keypads, gesture or graphical input devices, motion input devices, touchscreen interfaces, one or more displays, audio units, voice recognition units, vibratory devices, computer mice, and any other suitable user interface.

The processor 410 and memory 430 may include non-volatile memory for storing computable-readable instructions, data, data structures, program modules, code, microcode, and other software components for storing the computer-readable instructions in non-transitory computable-readable mediums in connection with the other hardware components for carrying out the methodologies described herein. Software components may include source code, compiled code, interpreted code, executable code, static code, dynamic code, encrypted code, or any other suitable type of code or computer instructions implemented using any suitable high-level, low-level, object-oriented, visual, compiled, or interpreted programming language.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for facilitating sub-merchant onboarding by generating and maintaining a blockchain using an electronic payment processing system, the method comprising:

receiving, by an acquirer processor from a payment facilitator, a sub-merchant onboarding request, wherein the sub-merchant onboarding request comprises a plurality of payment facilitator data and a plurality of sub-merchant data received by the payment facilitator from a sub-merchant;

transmitting, by the acquirer processor to the sub-merchant, a contract including terms of processing transactions, wherein the contract is delivered via a web link;

receiving, by the acquirer processor from the sub-merchant, the signed contract;

publishing, by the acquirer processor to the blockchain, the signed contract, wherein the blockchain is a hybrid permissioned blockchain;

storing, by the acquirer processor, information about a hierarchical relationship between the payment facilitator and the sub-merchant in a database external to the blockchain, wherein the database is a relational database;

providing, by the acquirer processor to one or more third-party sources, the plurality of sub-merchant data and the plurality of payment facilitator data for background checks;

publishing, by the acquirer processor to the blockchain, responses from the one or more third-party sources;

generating, by the acquirer processor, an onboarding decision based on the plurality of sub-merchant data, the plurality of payment facilitator data, and the responses from the one or more third-party sources;

publishing, by the acquirer processor to the blockchain, the onboarding decision;

providing, by the acquirer processor to the payment facilitator, the onboarding decision;

granting, by the acquirer processor, the payment facilitator and the sub-merchant access to various transactions stored in the blockchain with various access levels;

providing, by the acquirer processor, the payment facilitator and the sub-merchant with a web portal as a blockchain access interface;

accessing, by the acquirer processor, the plurality of sub-merchant data, or the plurality of payment facilitator data, and the onboarding decision in the blockchain;

calculating, by the acquirer processor, a score based on combination of the plurality of payment facilitator data or the plurality of sub-merchant data and attributes of an additional product or an additional service; and transmitting, by the acquirer processor, an additional electronic offer of the additional product or the additional service to the sub-merchant or the payment facilitator based on the score.

2. The computer-implemented method of claim 1, wherein the blockchain is distributed among permissioned participants.

3. The computer-implemented method of claim 1, wherein the additional electronic offer of the additional product or the additional service is further generated based on a data scheme.

4. The computer-implemented method of claim 1, further comprising:

determining, by the acquirer processor, a numeric value to charge for processing transactions for the sub-merchant.

5. The computer-implemented method of claim 1, wherein the background checks include a tax ID number (TIN) validation, an Office of Foreign Asset Control (OFAC) check, a credit check through one or more credit reporting agencies, a demand deposit account (DDA) check, or a know your customer (KYC) check.

6. A system for facilitating sub-merchant onboarding by generating and maintaining a blockchain, the system comprising:

an acquirer processor comprising a data storage device storing instructions for maintaining the blockchain in an electronic storage medium and a processor configured to execute the instructions to perform operations of:

receiving, by the acquirer processor from a payment facilitator, a sub-merchant onboarding request, wherein the sub-merchant onboarding request comprises a plurality of payment facilitator data and a plurality of sub-merchant data received by the payment facilitator from a sub-merchant;

transmitting, by the acquirer processor to the sub-merchant, a contract including terms of processing transactions, wherein the contract is delivered via a web link;

receiving, by the acquirer processor from the sub-merchant, the signed contract;

publishing, by the acquirer processor to the blockchain, the signed contract, wherein the blockchain is a hybrid permissioned blockchain;

storing, by the acquirer processor, information about a hierarchical relationship between the payment facilitator and the sub-merchant in a database external to the blockchain, wherein the database is a relational database;

providing, by the acquirer processor to one or more third-party sources, the plurality of sub-merchant data and the plurality of payment facilitator data for background checks;

publishing, by the acquirer processor to the blockchain, responses from the one or more third-party sources;

generating, by the acquirer processor, an onboarding decision based on the plurality of sub-merchant data, the plurality of payment facilitator data, and the responses from the one or more third-party sources;

publishing, by the acquirer processor to the blockchain, the onboarding decision;

providing, by the acquirer processor to the payment facilitator, the onboarding decision;

granting, by the acquirer processor, the payment facilitator and the sub-merchant access to various transactions stored in the blockchain with various access levels;

providing, by the acquirer processor, the payment facilitator and the sub-merchant with a web portal as a blockchain access interface;

accessing, by the acquirer processor, the plurality of sub-merchant data, or the plurality of payment facilitator data, and the onboarding decision in the blockchain;

calculating, by the acquirer processor, a score based on combination of the plurality of payment facilitator data or the plurality of sub-merchant data and attributes of an additional product or an additional service; and transmitting, by the acquirer processor, an additional electronic offer of the additional product or the additional service to the sub-merchant or the payment facilitator based on the score.

7. The system of claim 6, wherein the blockchain is distributed among permissioned participants.

8. The system of claim 6, wherein the additional electronic offer of the additional product or the additional service is further generated based on a data scheme.

9. The system of claim 6, the operations further comprising:

determining, by the acquirer processor, a numeric value to charge for processing transactions for the sub-merchant.

10. The system of claim 6, wherein the background checks include a tax ID number (TIN) validation, an Office of Foreign Asset Control (OFAC) check, a credit check through one or more credit reporting agencies, a demand deposit account (DDA) check, or a know your customer (KYC) check.

11. A non-transitory machine-readable medium storing instructions that, when executed by an acquirer processor, causes the acquirer processor to perform a method for facilitating sub-merchant onboarding by generating and maintaining a blockchain, the method including:

receiving, by the acquirer processor from a payment facilitator, a sub-merchant onboarding request, wherein the sub-merchant onboarding request comprises a plurality of payment facilitator data and a plurality of sub-merchant data received by the payment facilitator from a sub-merchant;

transmitting, by the acquirer processor to the sub-merchant, a contract including terms of processing transactions, wherein the contract is delivered via a web link;

receiving, by the acquirer processor from the sub-merchant, the signed contract;

publishing, by the acquirer processor to the blockchain, the signed contract, wherein the blockchain is a hybrid permissioned blockchain;

storing, by the acquirer processor, information about a hierarchical relationship between the payment facilitator and the sub-merchant in a database external to the blockchain, wherein the database is a relational database;

providing, by the acquirer processor to one or more third-party sources, the plurality of sub-merchant data and the plurality of payment facilitator data for background checks;

publishing, by the acquirer processor to the blockchain, responses from the one or more third-party sources;

generating, by the acquirer processor, an onboarding decision based on the plurality of sub-merchant data, the plurality of payment facilitator data, and the responses from the one or more third-party sources;

publishing, by the acquirer processor to the blockchain, the onboarding decision;

providing, by the acquirer processor to the payment facilitator, the onboarding decision;

granting, by the acquirer processor, the payment facilitator and the sub-merchant access to various transactions stored in the blockchain with various access levels;

providing, by the acquirer processor, the payment facilitator and the sub-merchant with a web portal as a blockchain access interface;

accessing, by the acquirer processor, the plurality of sub-merchant data, or the plurality of payment facilitator data, and the onboarding decision in the blockchain;

calculating, by the acquirer processor, a score based on combination of the plurality of payment facilitator data or the plurality of sub-merchant data and attributes of an additional product or an additional service; and transmitting, by the acquirer processor, an additional electronic offer of the additional product or the additional service to the sub-merchant or the payment facilitator based on the score.

12. The non-transitory machine-readable medium of claim 11, wherein the blockchain is distributed among permissioned participants.

13. The non-transitory machine-readable medium of claim 11, wherein the additional electronic offer of the additional product or the additional service is further generated based on a data scheme.

14. The non-transitory machine-readable medium of claim 11, the method further comprising:

determining, by the acquirer processor, a numeric value to charge for processing transactions for the sub-merchant.

* * * * *